United States Patent
Panziera

(10) Patent No.: US 8,713,576 B2
(45) Date of Patent: Apr. 29, 2014

(54) LOAD BALANCING FOR PARALLEL TASKS

(75) Inventor: Jean-Pierre Panziera, Paris (FR)

(73) Assignee: Silicon Graphics International Corp., Milpitas, CA (US)

( * ) Notice: Subject to any disclaimer, the term of this patent is extended or adjusted under 35 U.S.C. 154(b) by 1810 days.

(21) Appl. No.: 11/677,460

(22) Filed: Feb. 21, 2007

(65) Prior Publication Data

US 2007/0198986 A1    Aug. 23, 2007

Related U.S. Application Data

(60) Provisional application No. 60/775,117, filed on Feb. 21, 2006.

(51) Int. Cl.
*G06F 9/46* (2006.01)
(52) U.S. Cl.
USPC ............................ 718/105; 718/102; 718/104
(58) Field of Classification Search
None
See application file for complete search history.

(56) References Cited

U.S. PATENT DOCUMENTS

| | | | | |
|---|---|---|---|---|
| 7,155,716 | B2 * | 12/2006 | Hooman et al. | 718/102 |
| 7,809,774 | B2 * | 10/2010 | Tichy et al. | 707/822 |
| 7,810,099 | B2 * | 10/2010 | Dettinger et al. | 718/106 |
| 2006/0179267 | A1 * | 8/2006 | Chatterjee et al. | 712/11 |

OTHER PUBLICATIONS

Susan Blackford; The Two-dimensional Block Cyclic Distribution; ; May 13, 1997; Retrived from internet on Feb. 4, 2011; pp. 1-3.*
Prashanth B. Bhat; Block Cyclic Redistribution over Heterogeneous Networks; 1998; International conference of Parallel and Distributed Computing Systems; pp. 1-8.*

* cited by examiner

*Primary Examiner* — Abdullah Al Kawsar
(74) *Attorney, Agent, or Firm* — Sunstein Kann Murphy & Timbers LLP

(57) ABSTRACT

Techniques for balancing processing loads when performing parallel tasks on one or more processing nodes that share memory resources are provided. For some embodiments, the techniques involve distributing work according to an alternate block cyclic distribution scheme of at least one dimension, wherein work processes are assigned to sets of threads in at least first and second adjacent blocks based on round-robin manner according to a first sequence and an alternate round-robin manner according to a second sequence that is a mirror image of the first sequence, respectively.

5 Claims, 3 Drawing Sheets

FIG. 2A

Q ←→  T=PxQ TREADS (0...5)

P=2

| 0 | 2 | 4 | 0 | 2 | 4 | 0 | 2 | 4 | 0 | 2 | 4 |
|---|---|---|---|---|---|---|---|---|---|---|---|
| 1 | 3 | 5 | 1 | 3 | 5 | 1 | 3 | 5 | 1 | 3 | 5 |
| 0 | 2 | 4 | 0 | 2 | 4 | 0 | 2 | 4 | 0 | 2 | 4 |
| 1 | 3 | 5 | 1 | 3 | 5 | 1 | 3 | 5 | 1 | 3 | 5 |
| 0 | 2 | 4 | 0 | 2 | 4 | 0 | 2 | 4 | 0 | 2 | 4 |
| 1 | 3 | 5 | 1 | 3 | 5 | 1 | 3 | 5 | 1 | 3 | 5 |
| 0 | 2 | 4 | 0 | 2 | 4 | 0 | 2 | 4 | 0 | 2 | 4 |
| 1 | 3 | 5 | 1 | 3 | 5 | 1 | 3 | 5 | 1 | 3 | 5 |
| 0 | 2 | 4 | 0 | 2 | 4 | 0 | 2 | 4 | 0 | 2 | 4 |
| 1 | 3 | 5 | 1 | 3 | 5 | 1 | 3 | 5 | 1 | 3 | 5 |
| 0 | 2 | 4 | 0 | 2 | 4 | 0 | 2 | 4 | 0 | 2 | 4 |
| 1 | 3 | 5 | 1 | 3 | 5 | 1 | 3 | 5 | 1 | 3 | 5 |

| 0 | 0 | 0 | 0 | 0 | 0 | 0 | 0 | 0 | 0 | 0 | 0 |
|---|---|---|---|---|---|---|---|---|---|---|---|
| 0 | 1 | 1 | 1 | 1 | 1 | 1 | 1 | 1 | 1 | 1 | 1 |
| 0 | 1 | 2 | 2 | 2 | 2 | 2 | 2 | 2 | 2 | 2 | 2 |
| 0 | 1 | 2 | 3 | 3 | 3 | 3 | 3 | 3 | 3 | 3 | 3 |
| 0 | 1 | 2 | 3 | 4 | 4 | 4 | 4 | 4 | 4 | 4 | 4 |
| 0 | 1 | 2 | 3 | 4 | 5 | 5 | 5 | 5 | 5 | 5 | 5 |
| 0 | 1 | 2 | 3 | 4 | 5 | 6 | 6 | 6 | 6 | 6 | 6 |
| 0 | 1 | 2 | 3 | 4 | 5 | 6 | 7 | 7 | 7 | 7 | 7 |
| 0 | 1 | 2 | 3 | 4 | 5 | 6 | 7 | 8 | 8 | 8 | 8 |
| 0 | 1 | 2 | 3 | 4 | 5 | 6 | 7 | 8 | 9 | 9 | 9 |
| 0 | 1 | 2 | 3 | 4 | 5 | 6 | 7 | 8 | 9 | A | A |
| 0 | 1 | 2 | 3 | 4 | 5 | 6 | 7 | 8 | 9 | A | B |

LOAD BALANCING FOR PARALLEL TASKS

CROSS-REFERENCE TO RELATED APPLICATIONS

This application claims benefit of U.S. Provisional Patent Application Ser. No. 60/775,117, filed Feb. 21, 2006, which is herein incorporated by reference.

BACKGROUND OF THE INVENTION

1. Field of the Invention

Embodiments of the present invention generally relate to improving workload distribution for parallel computing application

2. Description of the Related Art

Computer system performance can be increased by increasing computing power. For example, parallel computer systems utilizing more powerful processors and/or a larger number of processors enable applications to run faster or solve more complex problems. The efficiency of applications run on parallel systems is directly related to dataset and workload distribution.

Massively parallel supercomputers, such as those that may be formed using the Altix systems available from Silicon Graphics, Inc. may include several hundred processors and several tera-bytes (TBs) of memory. These computers can be interconnected together to form a large cluster. Such systems make it possible to solve problems that advance the bounds of scientific research. Example applications span a wide variety of scientific endeavors, including climate simulations for weather prediction, 3-D reservoir modeling for oil and gas exploration and production, and flight path calculations for space flight.

A parallel application uses several (up to several thousands) processors to solve a problem. Since the computations are split among tasks running on the different processors available, the application runs faster. Ideally, assuming 100% efficiency, the total run time for an application run in a parallel system is found by dividing the run time on a single processor by the total number of processors in the parallel system. As the problem size increases, the amount of work increases as well. Parallel computers reduce the application total runtime and make it possible for users to solve larger problems in manageable time.

The efficiency of parallel applications is directly related to the workload distribution. To parallelize an application the workload is distributed among the various tasks (parallel processing threads). If $T\_1$ is the application runtime when running on a single processor, the ideal time when running in parallel with M threads will be:

$$T\_ideal(M) = T1/M.$$

If the distribution is uneven, however, the thread with the largest amount of work will run longer than the others and its runtime will correspond to the runtime of the whole application:

$$T\_application(M) = T\_longest(M) \text{ and } T\_longest(M) > T\_ideal(M).$$

Since the computation time is assumed to be proportional to workload $$T\_application(M) = T\_longest(M) = Max\_Workload(M)/Average\_Workload(M) * T\_ideal.$$

The previous formula illustrates the importance of the workload distribution. Any deviation from an optimal distribution where each thread gets the same amount of work, translates into a less efficient parallel application. The ratio Max_Workload/Average_Workload defines the workload balancing. For a perfect distribution the workload balancing is 1, the larger the workload ratio, the less efficient the parallelism.

Workload distribution is performed either statically at compilation time or dynamically at runtime. When the computing cost of each work item to be distributed among the different threads is known in advance, the application may define a fixed distribution pattern. When the computing cost of the different operations is highly variable, the application may use a dynamic scheme to distribute the workload. A dynamic distribution scheme involves a higher overhead than a static one. Whenever an application has a predictable workload, the distribution may be defined statically (at compilation time).

Static workload distribution allows for optimal dataset distribution. In general, the computing cost of an elementary item depends not only on the number of operations to be performed, but also on how the thread accesses the data it is operating on. If the access is local, the efficiency is the best. If it is remote, the cost could be much higher. With static workload distribution, the dataset can be distributed so that each thread access data locally as much as possible. The communication overhead can be reduced and the parallel efficiency further improved.

As described above, static workload distribution may reduce parallelism and communication overhead. The parallel efficiency depends directly on the workload distribution, such that the best static workload distribution will improve the application parallel efficiency.

Typical static distributions consist of splitting the workload into equal parts either contiguous or cyclically distributed (e.g., in a round-robin distribution). Alternatively, rather than distributing one item at the time, a "block-cyclic" approach extends the round-robin scheme to contiguous blocks of fixed size. Distributing blocks rather than single items may be advantageous when contiguous items share common parts. Considering three threads A, B and C, the different static distributions mentioned above would split 24 workload items as shown in the following table:

TABLE 1

| CONVENTIONAL WORKLOAD DISTRIBUTION SCHEMES | |
|---|---|
| Equal partitions | A A A A A A A A- B B B B B B B B- C C C C C C C C |
| Simple cyclic (round-robin): | A B C -A B C- A B C- A B C- A B C -A B C -A B C- A B C |
| Block cyclic (block size = 2): | A A B B C C- A A B B C C -A A B B C C -A A B B C C |

Unfortunately, when the cost for each element varies, the static distributions are generally not optimal. Further, if the cost for each element increases (or decreases) monotonically, simple cyclic and block cyclic distributions may not provide optimal workload balancing.

Accordingly, what is needed is an improved scheme for workload distribution in parallel systems.

SUMMARY OF THE INVENTION

Techniques for balancing processing loads when performing parallel tasks on one or more processing nodes that share memory resources are provided. For some embodiments, the techniques involve distributing work according to an alternate block cyclic distribution scheme of at least one dimension, wherein work processes are assigned to sets of threads in at least first and second adjacent blocks based on round-robin manner according to a first sequence and an alternate round-robin manner according to a second sequence that is a mirror image of the first sequence, respectively.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A illustrates an exemplary work distribution diagram utilizing block-cyclic distribution scheme.

FIG. 2B illustrates thread updates for the exemplary work distribution scheme of FIG. 2A.

DETAILED DESCRIPTION

Embodiments of the present invention provide an improved scheme for workload distribution in parallel systems. The scheme may be referred to as an alternate cyclic and block cyclic distribution scheme which, in some cases, may provide a better workload balancing than the other simple static distributions.

An Exemplary System

Figure 1:
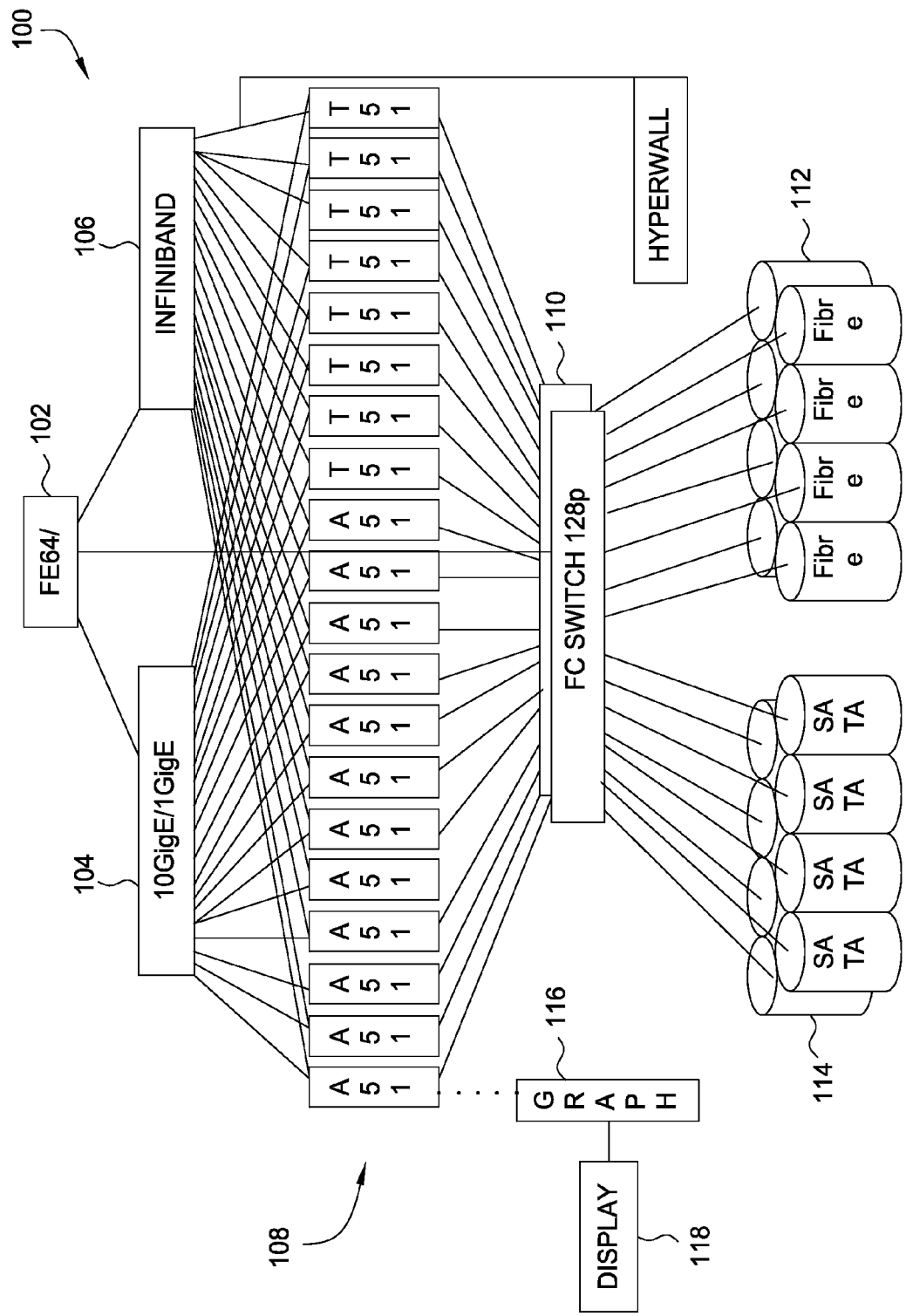
FIG. 1 illustrates an exemplary parallel computer system in which embodiments of the present invention may be practiced.

FIG. 1 illustrates an exemplary parallel computing system in which embodiments of the present invention may be practiced. The system 100 utilizes a plurality of processing nodes 108. A front end 102 (e.g., formed by one or more multi-processor nodes) may be used, for example, to initialize the system and download code to be executed by the processing nodes 108. A graphics system (e.g., utilizing one or more pipelined graphics processing units) 116 may allow for the display of status and/or results of executing code to be displayed to a user on a display system 118, for example, including one or more computer monitors.

The nodes 108 may be so-called "fat" nodes with multiple processors (e.g., up to 512 or more) and substantial memory (e.g., up to 2 GB per processor or more) to accommodate a variety of shared-memory processor codes that may be optimized to scale well to large processor counts. In the illustrated system, 20 processor nodes are shown, connected by a high speed network switches (e.g., one or more 10 Gig/1 Gig Ethernet switches 104 and/or one or more InfiniBand switches 106).

For some embodiments, each processor node 108 may be operated as a single system image (SSI) managed by an operating system (e.g., the Linux operating system). Inter-node communications through the switches 104 and 106 may utilize any suitable protocol, such as the Message Passing Interface (MPI) of SGI.

Within an SSI on a node 108, a pair of processors may share a front-side bus, a memory controller and an array of local memory. The nodes 108 may be tied together through the high-bandwidth, low-latency NUMA link™ fat-tree interconnect. Although memory is distributed throughout the system, it may remain globally addressable and cache coherent via a directory-based protocol. The memory latencies for non-local data, however, are higher than that for local data.

In shared memory systems, as illustrated in FIG. 1, despite the large bisection bandwidth of the system (e.g., up to 400 GB/s for a 512-processor node), the remote access bandwidth may be only a fraction (10-20%) of what is available for local access. To maximize parallel performance on this type of ccNUMA (cache-coherent non-uniform memory access) architecture, code may be designed such that processing threads may be designed operate on local data whenever possible, thereby reducing remote accesses.

In systems utilizing distributed memory, on the other hand, access to non-local (remotely distributed memory) may also be only a fraction of what is available for local access due to messaging overhead. In a similar manner, however, to maximize parallel performance on this type of distributed memory architectures, code may be designed such that processing threads may be designed operate on local data whenever possible, thereby reducing messaging overhead for access to distributed memory.

Alternate Block Cyclic Work Distribution

The distribution schemes presented herein represent a new distribution scheme with alternate directions repeated in each cycle or block. This alternate cyclic distribution scheme may be applied to single items (alternate cyclic) or blocks as well (alternate block cyclic). In the alternate block-cyclic distribution scheme, within each block, a round-robin scheme with alternate directions (e.g., "mirrored reflections") utilized from one block to another. Using the example in Table I above, these distributions may be (assuming block size=2).

TABLE 2

ALTERNATE CYCLIC WORKLOAD DISTRIBUTION SCHEMES

| | |
|---|---|
| Simple Cyclic | A B C - A B C - A B C - A B C - A B C - A B C - A B C - A B C |
| Alternate Cyclic | A B C - C B A - A B C - C B A - A B C - C B A - A B C - CBA |
| Alternate Block Cyclic | A A B B C C - C C B B A A - A A B B C C - C C B B A A |

Where the simple cyclic distribution is repeated from TABLE 1 to facilitate comparison.

When the cost for each element varies, the static distributions are generally not optimal. If the cost for each element increases (or decreases) monotonically the alternate cyclic and block cyclic distributions almost always provide a better workload balancing than the other simple static distributions.

To compare the simple cyclic (round-robin) and the alternate cyclic schemes for the monotonously increasing case, an example of a double cycle of 2*M items for index "i" varying between "k" and "k+2*M", letting W(i) denote the workload of item "i", may be considered. For these 2 cycles, the equal partition workload assigned to thread "j" is:

WorkEqualPart(thread=$j$)=$W(k+2*j)+W(k+2*j+1)$ and,
MAX(WorkEqualPart)=WorkEqualPart
(thread=$M$)=$W(k+2M-1)+W(k+2*M)$ For the round-robin scheme, the workload assigned to thread "j" is:

WorkRoundRobin(thread=$j$)=$W(k+j)+W(k+j+M)$ and,
MAX(WorkRoundRobin)=WorkRoundRobin
(thread=$M$)=$W(k+M)+W(k+2*M)$ For the round-robin the max workload is handed to thread M:

WorkAlternateCyclic(thread=$j$)=$W(k+j)+W(k+2*M-j)$

For any "j", $W(k+j)<=W(k+M)$ and $W(k+2*M-j)<=W(k+2*M)$ so for each double cycle:

MAX(WorkAlternateCyclic)<=MAX(WorkRoundRobin)<=MAX(WorkEqualPart).

The general property demonstrated above similarly holds for the "block" variants: Block Cyclic of Alternate Block Cyclic. Note that the Equal Partition scheme may be viewed as a Block Cyclic partition with just one cycle and chunk size N/M, where N is the total number of items.

The following table presents the workload balance when using three threads (M=3) for the different schemes and with workloads regularly increasing for each of the N=24 items. For example, in the second column, "W(i)=i^2" the workload of item "i" depends on the index square "i^2".

TABLE 3

EXAMPLE ALTERNATE BLOCK CYCLIC WORKLOAD BALANCE

| Balancing for N = 24, M = 3 | W(i) = i | W(i) = i^2 | W(i) = i^3 | W(i) = sqrt(i) | W(i) = log2(i) |
|---|---|---|---|---|---|
| Equal partitions | 1,640 | 2,084 | 2,383 | 1,346 | 1,320 |
| Round-Robin | 1,080 | 1,124 | 1,166 | 1,051 | 1,062 |
| Alternate Cyclic | 1,000 | 1,016 | 1,033 | 1,006 | 1,019 |
| Block Round-Robin | 1,160 | 1,251 | 1,338 | 1,099 | 1,113 |
| Alternate Block Cyclic | 1,000 | 1,065 | 1,133 | 1,018 | 1,045 |

The general properties of alternate cyclic and alternate block-cyclic work distribution is is verified by the results shown in TABLE 3.

To illustrate concepts of the work distribution presented herein, the following embodiments will be described with reference to performing operations related to Triangular Matrix-Vector Multiplication. Those skilled in the art, however, will recognize that Triangular Matrix-Vector Multiplication is merely one example of a type of application that may benefit from the concepts presented herein. Thus, gains in efficiency demonstrated in this example application may also be realized in a wide variety of real-world applications containing operations that may be performed in a distributed manner on a highly parallel multi-processor system.

The Matrix-Vector multiplication is a linear algebra kernel often encountered. For dense general matrices, the workload distribution may be efficiently achieved equally splitting the Matrix along its Lines or its Columns. When the matrix is triangular, however, the equal partition scheme tends to lead to poor workload balancing if conventional workload distribution algorithms are utilized.

For an lower triangular matrix T of order N, with elements T(i,j) and X and Y two vectors of size N, the Matrix-Vector multiplication algorithm Y=T*X can be expressed as a double loop:

```
Foreach i = 1, N
    Foreach j = 1, i
        Y(i) = Y(i) + T(i,j) * y(j)
    End (loop on j)
End (loop on i)
```

The workload is represented by the number of iterations in the internal loop which is $N*(N+1)/2$ and corresponds to the number of elements "T(i,j)" of the triangular matrix. The workload for each thread depends on the number of matrix elements assigned to it. Note that the workload "W(i)" for each line "i" is simply "W(i)=i". It has been shown that both the Alternate Cyclic and the Alternate Block Cyclic distribution schemes presented herein may achieve a near perfect workload balancing.

Example Application In Matrix Factorization

One example application where the work distribution technique presented herein may be utilized is in the Linpack benchmark. The Linpack benchmark computes the solution of a linear system of equations A.x=b, where A is a dense N×N random matrix, and x and b are vectors of size N. Matrix A is first factorized in place as the product A=L.U, where L and U represent lower and upper triangular matrices. For numerical stability the factorization algorithm uses partial row pivoting. The solution x is then found in two successive triangular solve steps, L.z=b and finally U.x=z. The factorization requires $(2/3)*N^3$ floating point operations, and the two triangular solves account for $N^2$ floating point operations each. As N increases, the factorization phase dominates the computation time.

For purposes of illustration, FIG. 2A illustrates simple application of the block-cyclic distribution for factorization of a global N×N matrix A processed with K*K tiles (square blocks), with K=12 in the example. The matrix itself has 12×12 tiles, and the T=6 threads are organized in groups or "blocks" of P×Q=2×3 process grids. In this example, tiles are distributed in a "double round-robin" fashion, where each tile is indexed with the owner thread number (0-5 starting with the upper left tile in a process grid). Block-cyclic thread distribution ensures a reasonably balanced partitioning of the workload across different tasks throughout the entire factorization. However, as previously for relative small N×N matrices (e.g., with N<=1000), the sensitivity of panel factorization to communication overhead is especially pronounced, which limits the global performance.

Given the weight of the matrix multiplication kernel, the net workload balance depends primarily on the tile distribution. In FIG. 2B, the number of block updates is given for each tile. The workload follows the factorization algorithm: it is null for the top and the leftmost tiles, but maximum in the lower right corner. With the standard block-cyclic distribution scheme applied to this matrix (as shown in FIG. 2A), each group has a systematic bias in which thread 0 is assigned to a tile requiring 1 or 2 fewer updates than the lower right tile assigned to thread 5. Unfortunately, this may cause a substantial workload variation across threads (e.g., 67 updates for thread 0 and 103 updates for thread 5, with an average of 84.3 updates, for one example application).

Figure 3:
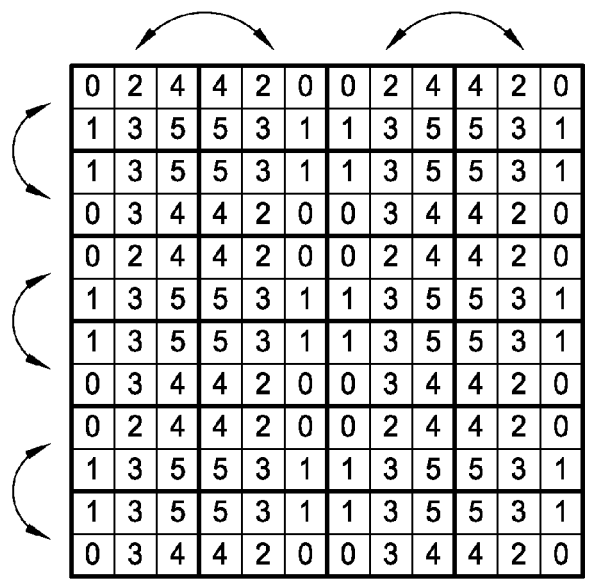
FIG. 3 illustrates an exemplary work distribution diagram utilizing an alternate block-cyclic distribution scheme.

For some embodiments, the "alternate" block-cyclic distribution may be utilized in an effort to achieve more even work distribution. This alternate block-cyclic distribution is illustrated in FIG. 3. When compared with the simple block-cyclic work distribution shown in FIG. 2A, the alternate block cyclic distribution may significantly reduce load imbalance.

In the example shown in FIG. 3, thread distribution in every other processing grid is mirrored in both P and Q directions. For example, starting with the top left processing grid, the thread distribution in the Q direction (0-2-4) is mirrored in the processing grid adjacent to the right (4-2-0). In a similar manner, the thread distribution in the P direction (0-1) is mirrored in the processing grid adjacent and below (1-0). For other embodiments, thread distribution may be mirrored in only one direction (e.g., the P or Q directions), for example, to minimize inter-cluster communications in certain applications. For some applications, rather than mirror thread distribution in every other processing grid in both P and Q directions, thread distribution in every other processing grid may be mirrored in only one direction (P or Q).

The alternate block-cyclic distribution scheme retains advantages of the regular block-cyclic distribution for communications that are restricted in either the row or column directions. In addition, it levels the workload distribution by averaging the tasks over groups of four contiguous blocks. With the alternating block-cyclic distribution scheme, the per-thread workload for FIG. 3 may varies between 80 and 88 updates, forming a much tighter bound to the average value of 84.3 than the standard block-cyclic scheme does (which varied from 67 to 103) in the example application referenced above.

Figure 4:
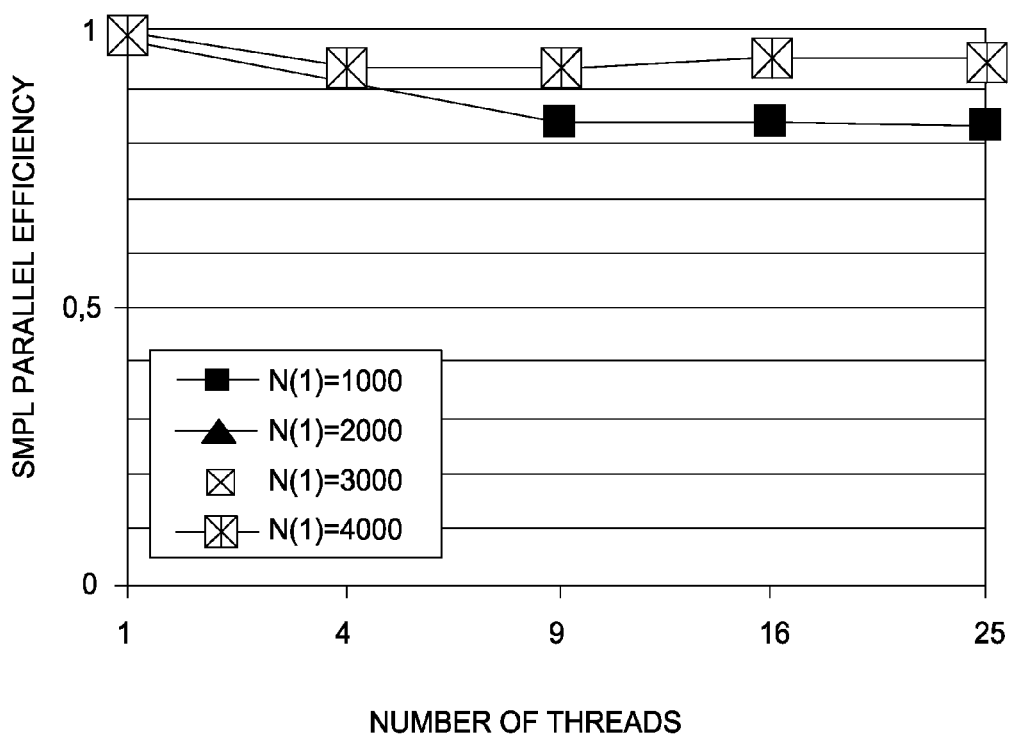
FIG. 4 illustrates processing efficiency achievable utilizing embodiments of the present invention.

Efficiency achieved for an example implementation for Linpack utilizing alternate block-cyclic workload distribution is illustrated in FIG. 4. The example assumes that the same matrices as described above (12×12) and that alternate block-cyclic distribution is employed. As illustrated, for large matrix sizes, this implementation provides more than 95% parallel efficiency when using 25 threads. This is much more efficient when compared to a known high performance Linpack algorithm-HPL (which has been measured at 90%) and a significant improvement over another known implementation, LAPACK (which has been measured at 36%). One of the more significant advantages is for small matrices (e.g., for N(1)=1000, $K^2$=25), where SMPL achieves 83% efficiency (studies have shown HPL to achieve 58%, and LAPACK to achieve 18%).

CONCLUSION

Embodiments of the present invention provide techniques that may distribute workloads in a manner that increases parallel processing efficiency. The techniques may be referred to as alternate cyclic and alternate block cyclic distribution schemes which, in some cases, may provide a better workload balancing than the other simple static distributions While the foregoing is directed to embodiments of the present invention, other and further embodiments of the invention may be devised without departing from the basic scope thereof, and the scope thereof is determined by the claims that follow.

What is claimed is:

1. A method of distributing a plurality of computational workloads between a plurality of processing threads executing in a parallel computing system, the method comprising:
    arranging, by a processing node in the parallel computing system, the plurality of computational workloads in order of computational cost;
    dividing the arranged computational workloads into a plurality of work cycles, each work cycle having a number of arranged computational workloads equal to a multiple of the number of the plurality of processing threads; and
    distributing the computational workloads among the plurality of processing threads according to a sequence of distribution patterns, wherein:
    a first work cycle distributes its plurality of computational workloads to the plurality of processing threads according to a first distribution pattern in the sequence, and
    each subsequent work cycle distributes its plurality of computational workloads to the plurality of processing threads according to a distribution pattern that is the reverse of the distribution pattern immediately preceding it in the sequence,
    wherein a processing thread that receives a high cost workload in a given work cycle receives a low cost workload in a subsequent work cycle, thereby balancing the plurality of computational workloads among the plurality of processing threads.

2. The method of claim 1, wherein each work cycle consists of one workload for each processing thread, so that the workloads are distributed according to an alternating simple cyclic scheme.

3. The method of claim 1, wherein each work cycle consists of the same number of at least two workloads for each processing thread, so that the workloads are distributed according to an alternating block cyclic scheme.

4. The method of claim 1, wherein the threads are provided with a plurality of orderings, the first work cycle distributes the first set of workloads according to a distribution pattern based on the plurality of orderings, and the second work cycle distributes the second set of workloads according to a distribution pattern that is the reverse of at least one of the plurality of orderings.

5. The method of claim 1, wherein the workloads relate to an application selected from the group consisting of: multiplying a matrix and a vector, factoring a matrix, and solving a linear system of equations.

* * * * *